US011878865B2

(12) United States Patent
Otsuki et al.

(10) Patent No.: US 11,878,865 B2
(45) Date of Patent: Jan. 23, 2024

(54) LOGISTICS ROBOT AND LOGISTICS SYSTEM

(71) Applicant: TOYOTA JIDOSHA KABUSHIKI KAISHA, Toyota (JP)

(72) Inventors: Nobuhisa Otsuki, Toyota (JP); Kunihiro Iwamoto, Nagakute (JP); Haeyeon Lee, Tokyo-to (JP); Wataru Kaku, Musashino (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 17/488,427

(22) Filed: Sep. 29, 2021

(65) Prior Publication Data

US 2022/0106120 A1 Apr. 7, 2022

(30) Foreign Application Priority Data

Oct. 2, 2020 (JP) .................................. 2020-168062
Sep. 13, 2021 (JP) .................................. 2021-148860

(51) Int. Cl.
*B65G 1/137* (2006.01)

(52) U.S. Cl.
CPC .... *B65G 1/1375* (2013.01); *B65G 2201/0235* (2013.01)

(58) Field of Classification Search
CPC ....................... B65G 1/1375; B65G 2201/0235
See application file for complete search history.

(56) References Cited

U.S. PATENT DOCUMENTS

| 8,909,368 | B2* | 12/2014 | D'Andrea | G05D 1/021 |
| | | | | 700/214 |
| 9,317,034 | B2* | 4/2016 | Hoffman | G06Q 10/00 |
| 9,389,609 | B1* | 7/2016 | Mountz | B65G 1/137 |
| 9,551,987 | B1* | 1/2017 | Mountz | B66F 9/063 |
| 9,637,310 | B1* | 5/2017 | Zou | G06Q 10/08355 |
| 10,112,771 | B2* | 10/2018 | D'Andrea | G05D 1/0022 |
| 10,286,558 | B1 | 5/2019 | Asada | |
| 10,308,430 | B1* | 6/2019 | Brady | G05D 1/0022 |
| 10,486,901 | B2* | 11/2019 | D'Andrea | G05D 1/0022 |
| 10,532,885 | B1* | 1/2020 | Brady | G06Q 10/083 |
| 10,613,533 | B1* | 4/2020 | Payson | G05D 1/0297 |
| 11,235,929 | B1* | 2/2022 | Brady | G06Q 30/0205 |
| 2012/0282070 | A1* | 11/2012 | D'Andrea | G05B 13/00 |
| | | | | 414/812 |
| 2013/0103552 | A1* | 4/2013 | Hoffman | G06Q 10/00 |
| | | | | 705/28 |
| 2014/0228999 | A1* | 8/2014 | D'Andrea | B66F 9/063 |
| | | | | 700/214 |
| 2016/0107838 | A1 | 4/2016 | Swinkels | |
| 2018/0039258 | A1* | 2/2018 | Zou | G05B 19/19 |

(Continued)

FOREIGN PATENT DOCUMENTS

| CN | 105856255 A | 8/2016 |
| CN | 111017069 A | 4/2020 |

(Continued)

*Primary Examiner* — Kyle O Logan
(74) *Attorney, Agent, or Firm* — Dickinson Wright, PLLC

(57) ABSTRACT

A logistics robot for transporting a package includes: a robot unit configured to make the logistics robot travel; and a storage unit configured to store the package. The robot unit and the storage unit are separable from each other.

4 Claims, 9 Drawing Sheets

(56) References Cited

U.S. PATENT DOCUMENTS

2019/0033837 A1 1/2019 Zanger et al.
2019/0220000 A1 7/2019 Takaya
2019/0317498 A1* 10/2019 Mere ................. G06Q 10/0832

FOREIGN PATENT DOCUMENTS

| JP | 2019-511437 A | 4/2019 |
| JP | 2020090151 A | 6/2020 |
| WO | 2017141679 A1 | 8/2017 |

* cited by examiner

LOGISTICS ROBOT AND LOGISTICS SYSTEM

BACKGROUND

Technical Field

The present disclosure relates to a logistics robot and a logistics system for transporting a package.

Background Art

Patent Literature 1 discloses a delivery system. The delivery system includes a vehicle that houses a package, and a movable body that is stored in the vehicle and movable from the vehicle to the outside of the vehicle. The movable body includes a housing room for housing a package transferred from the vehicle, and a lid that covers an upper portion of the housing room and is movable in a horizontal direction or toward the inside of the housing room. The vehicle includes a storage room for storing the movable body, and a package compartment that is provided above the storage room storing the movable body and houses the package to be transferred to the housing room.

LIST OF RELATED ART

Patent Literature 1: Japanese Laid-Open Patent Application Publication No. 2020-90151

SUMMARY

To develop a logistics service utilizing a robot is one of important issues in a future society. An object of the present disclosure is to provide a new logistics robot and a logistics system utilizing the new logistics robot.

A first aspect is directed to a logistics robot for transporting a package.

The logistics robot includes:
a robot unit configured to make the logistics robot travel; and
a storage unit configured to store the package.

The robot unit and the storage unit are separable from each other.

A second aspect is directed to a logistics system that delivers a logistics service.

The logistics system includes:
a logistics robot configured to transport a package; and
a management device configured to manage the logistics robot and to determine a travel route of the logistics robot.

The logistics robot includes:
a robot unit configured to make the logistics robot travel along the travel route; and
a storage unit configured to store the package.

The robot unit and the storage unit are separable from each other.

According to the present disclosure, the logistics robot includes the robot unit and the storage unit. The robot unit and the storage unit are separable from each other. This enables more flexible operation of the logistics robot. For example, it is possible to constitute a logistics robot by combining a single robot unit and a single storage unit. As another example, it is possible to constitute a large logistics robot by combining a plurality of robot units and a large storage unit. As yet another example, it is also possible to constitute a large logistics robot by combining a plurality of robot units and a plurality of storage units.

EMBODIMENTS

Embodiments of the present disclosure will be described with reference to the accompanying drawings.

1. Outline of Logistics System

Figure 1:
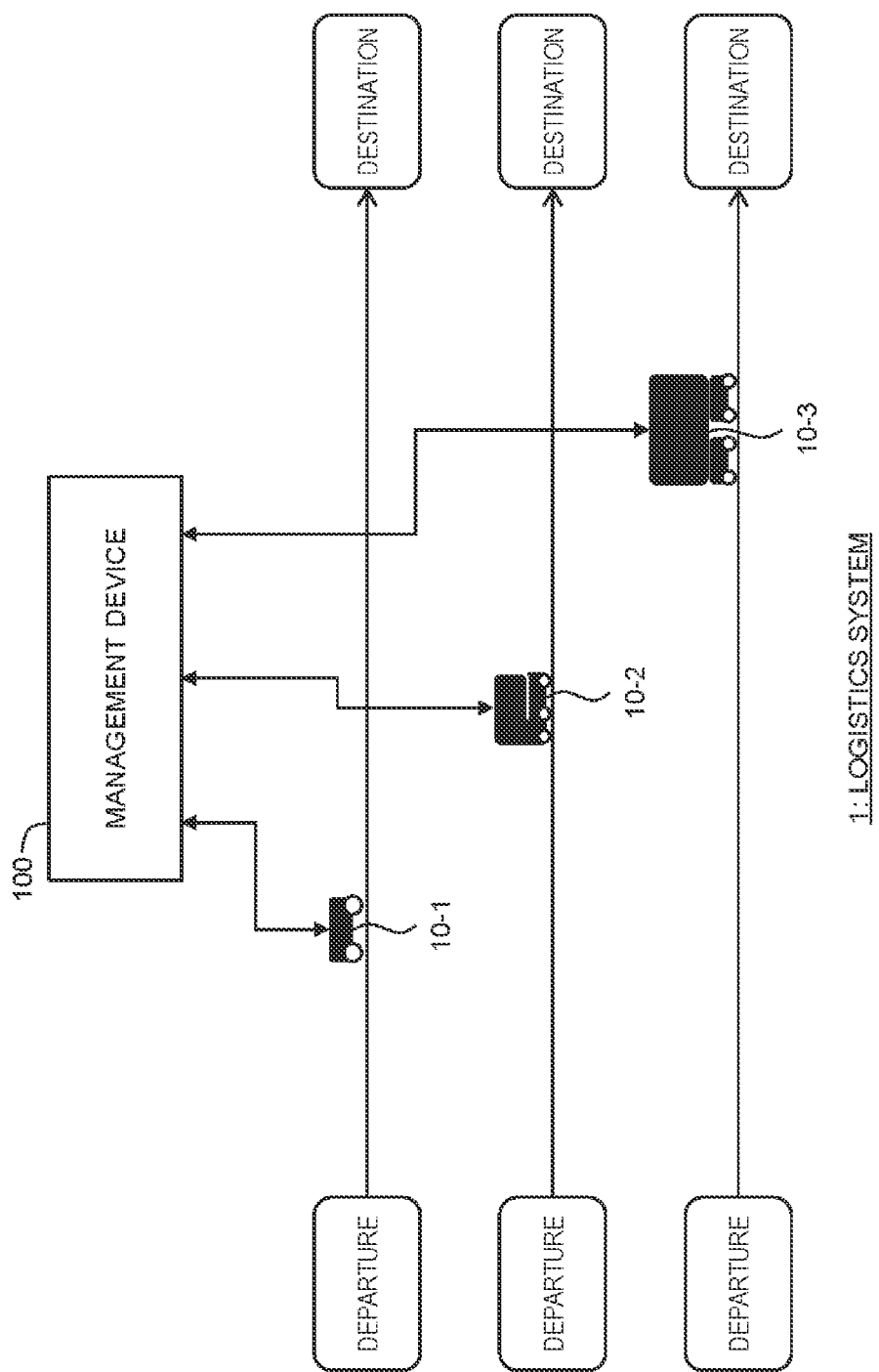
FIG. 1 is a conceptual diagram schematically showing a logistics system according to an embodiment of the present disclosure.

FIG. 1 schematically shows a logistics system 1 according to the present embodiment. The logistics system 1 delivers a logistics service. For example, the logistics system 1 delivers the logistics service in a certain area such as a certain city. The logistics system 1 includes a plurality of logistics robots 10 and a management device 100.

The logistics robot 10 is a robot mainly used for transporting a package. The package includes goods, foods, waste (e.g., garbage), and the like. For example, the logistics robot 10 is used for delivering goods, foods, and the like. As another example, the logistics robot 10 is used for collecting waste such as garbage. The logistics robot 10 may be configured to be capable of autonomous traveling and travel autonomously from a point of departure to a destination. The logistics robot 10 may be remotely operated by a remote operator. For example, the point of departure is a collection point of packages (e.g. a logistics center), and the destination is a delivery destination of a package (e.g. a user's residence). As another example, the point of departure is a delivery destination of a first package, and the destination is a delivery destination of a second package. As yet another example, the point of departure is a delivery destination of a final package, and the destination is the collection point of package.

A type of the logistics robot 10 is not limited to one. Multiple types of logistics robots 10 may be utilized. For example, as shown in FIG. 1, a small logistics robot 10-1, a medium logistics robot 10-2, a large logistics robot 10-3, and the like may be utilized.

The management device (management server) 100 manages the logistics robots 10 and the logistics service. The management device 100 is capable of communicating with each logistics robot 10 and collects information about a position and a status from each logistics robot 10. Moreover, the management device 100 receives a delivery request from a user. In response to the delivery request, the management device 100 assigns a logistics robot 10 to perform delivery and determines a travel route from a point of departure to a destination of the logistics robot 10. Then, the management device 100 notifies the assigned logistics robot 10 of the determined travel route. The logistics robot 10 autonomously travels from the point of departure to the destination along the travel route notified.

Hereinafter, the logistics robot 10 and the management device 100 according to the present embodiment will be described in more detail.

2. Configuration Example of Logistics Robot 2-1. Concrete Example

Figure 2:
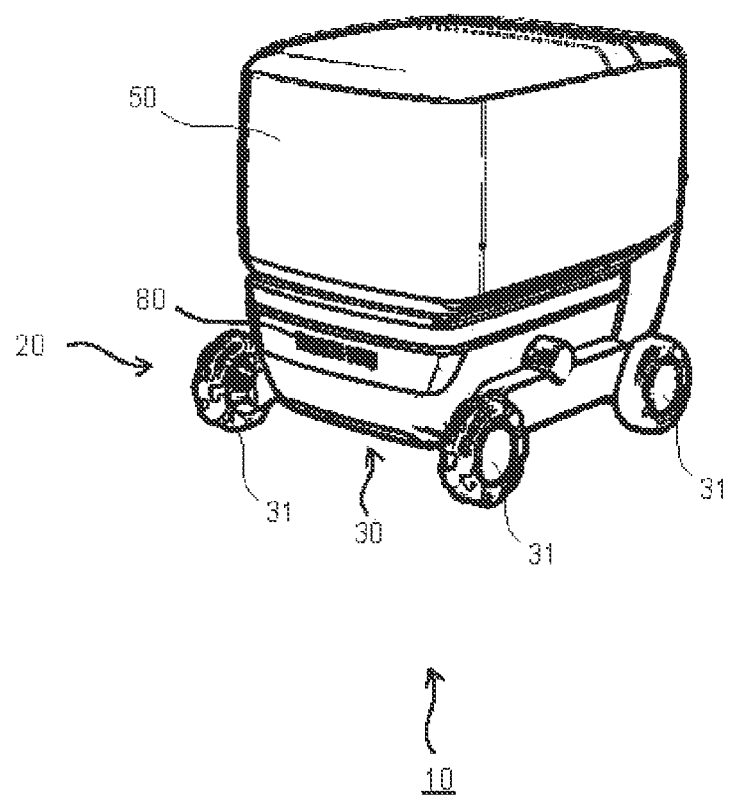
FIG. 2 is a perspective view for explaining an example of a logistics robot according to an embodiment of the present disclosure.

FIG. 2 is a perspective view for explaining an example of the logistics robot 10 according to the present embodiment. The logistics robot 10 includes a robot unit 20 and a storage unit 50.

The robot unit 20 has a travel function that makes the logistics robot 10 travel. The robot unit 20 may have an autonomous travel function that makes the logistics robot 10 travel autonomously. More specifically, the robot unit 20 includes a travel device 30 that accelerates, decelerates, and turns the logistics robot 10. The travel device 30 includes wheels 31 and motors (not shown) for driving the wheels 31. Acceleration and deceleration of the logistics robot 10 are performed by controlling the motors. Braking may be performed by the use of regenerative braking by control of the motors. At least one of the wheels 31 may be provided with a mechanical brake. Turning of the logistics robot 10 can be realized by controlling a difference in rotation speed between the left and right wheels 31 (motors). As another example, a steering mechanism for steering the wheels 31 may be provided. A certain wheel 31 may be an omni wheel.

The storage unit 50 stores a package P. In the example shown in FIG. 2, the storage unit 50 is provided above the robot unit 20.

The logistics robot 10 may further include a display device 80 that displays a variety of information. For example, the display device 80 displays a status of the logistics robot 10 (e.g., "In delivery", "Working", and the like). As another example, the display device 80 may display a message to people (e.g., "Hello", "Thank you", and the like). When the logistics robot 10 enters from an exclusive robot space (e.g., a logistics elevator, and the like) into a shared space shared with people, a message to people may be displayed on the display device 80. The display device 80 is disposed, for example, on a front surface of the robot unit 20.

Figure 3:
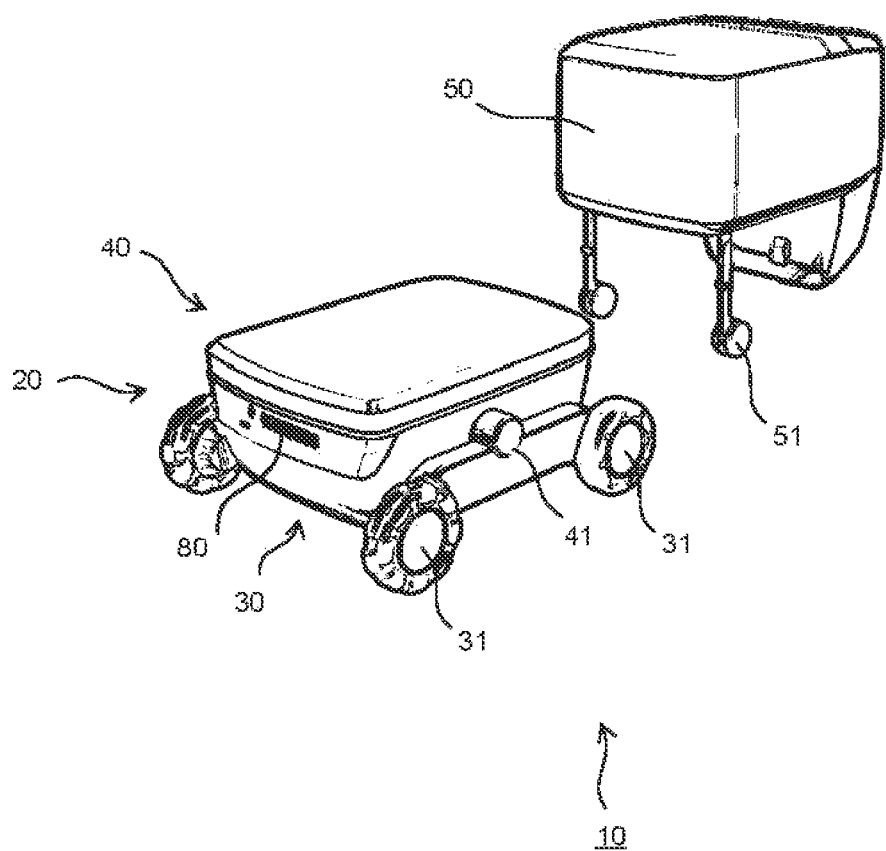
FIG. 3 is a perspective view for explaining an example of a logistics robot according to an embodiment of the present disclosure.

As shown in FIG. 3, the robot unit 20 and the storage unit 50 may be configured to be separable from each other. For example, when the robot unit 20 and the storage unit 50 are connected with each other, the robot unit 20 and the storage unit 50 are fixed to each other by a lock mechanism (not shown). By unlocking the lock mechanism, the robot unit 20 and the storage unit 50 are separated from each other.

For example, when the logistics robot 10 arrives at the delivery destination, the robot unit 20 and the storage unit 50 are separated from each other. After the separation, the robot unit 20 moves forward from under the storage unit 50 by operating the travel device 30. At this time, the storage unit 50 may put out an auxiliary wheel 51 so as not to fall.

The robot unit 20 may further include an upper device 40 in addition to the travel device 30. The upper device 40 is provided above the travel device 30. As shown in FIG. 3, when the robot unit 20 moves forward from under the storage unit 50, the upper device 40 is exposed. The upper device 40 performs a behavior different from acceleration, deceleration, and turning by the travel device 30.

For example, the upper device 40 may rotate on a lateral axis 41 (i.e., performs a pitching motion). When the upper device 40 performs a pitching motion independently of the travel device 30, it appears as if the upper device 40 gives a bow. For example, the robot unit 20 may be equipped with a sensor (e.g., a camera or a radar) for detecting presence of a human, and the upper device 40 may perform a pitching motion when a human is detected during the package delivery. Concurrently with the pitching motion of the upper device 40, a message (e.g., "Hello", "Thank you", and the like) to the human may be displayed on the display device 80. This enables a communication between the logistics robot 10 and the human.

Moreover, the upper device 40 can be used for moving the package. Hereinafter, moving of the package by the use of the upper device 40 will be described with reference to FIGS. 4 to 7.

Figure 4:
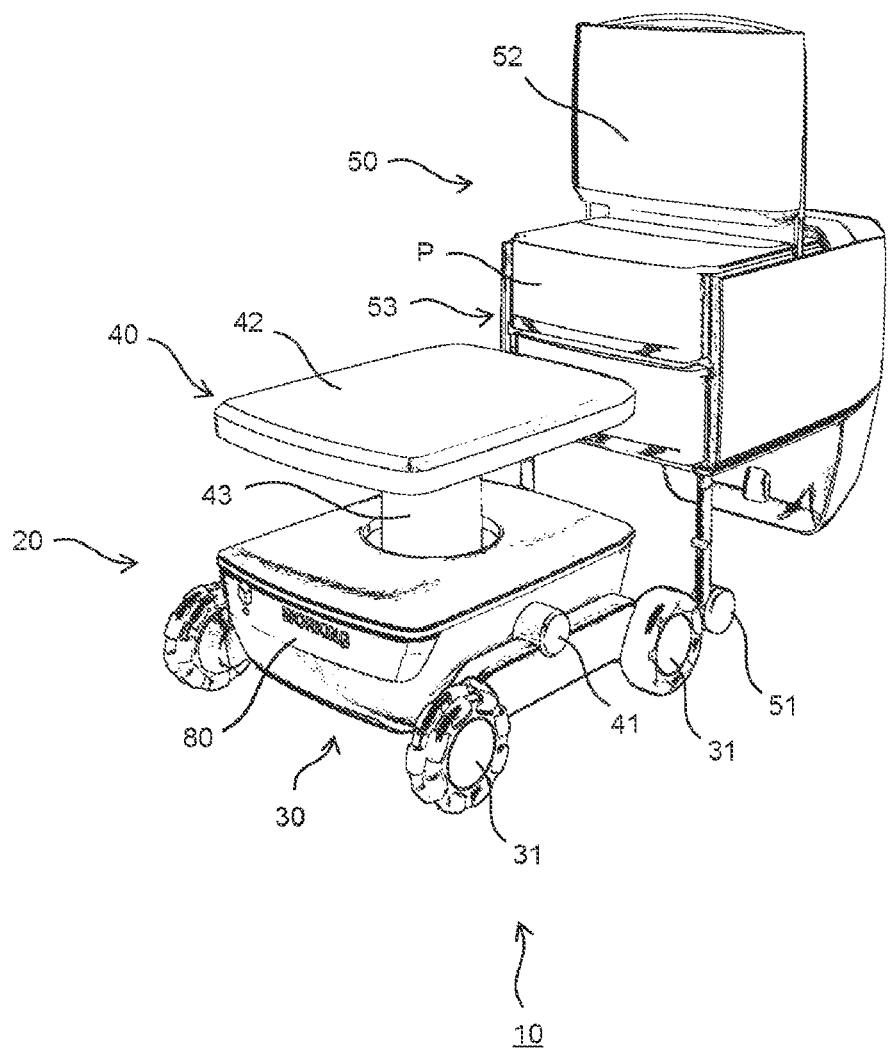
FIG. 4 is a perspective view for explaining an example of a logistics robot according to an embodiment of the present disclosure.

As shown in FIG. 4, the storage unit 50 has a lid 52 and a storage space 53 covered by the lid 52. One or more packages P are stored in the storage space 53. When the logistics robot 10 arrives at the delivery destination, the lid 52 of the storage unit 50 is opened automatically. Then, as shown in FIG. 5, the upper device 40 or the storage unit 50 moves the package P from the storage space 53 to the outside.

Figure 5:
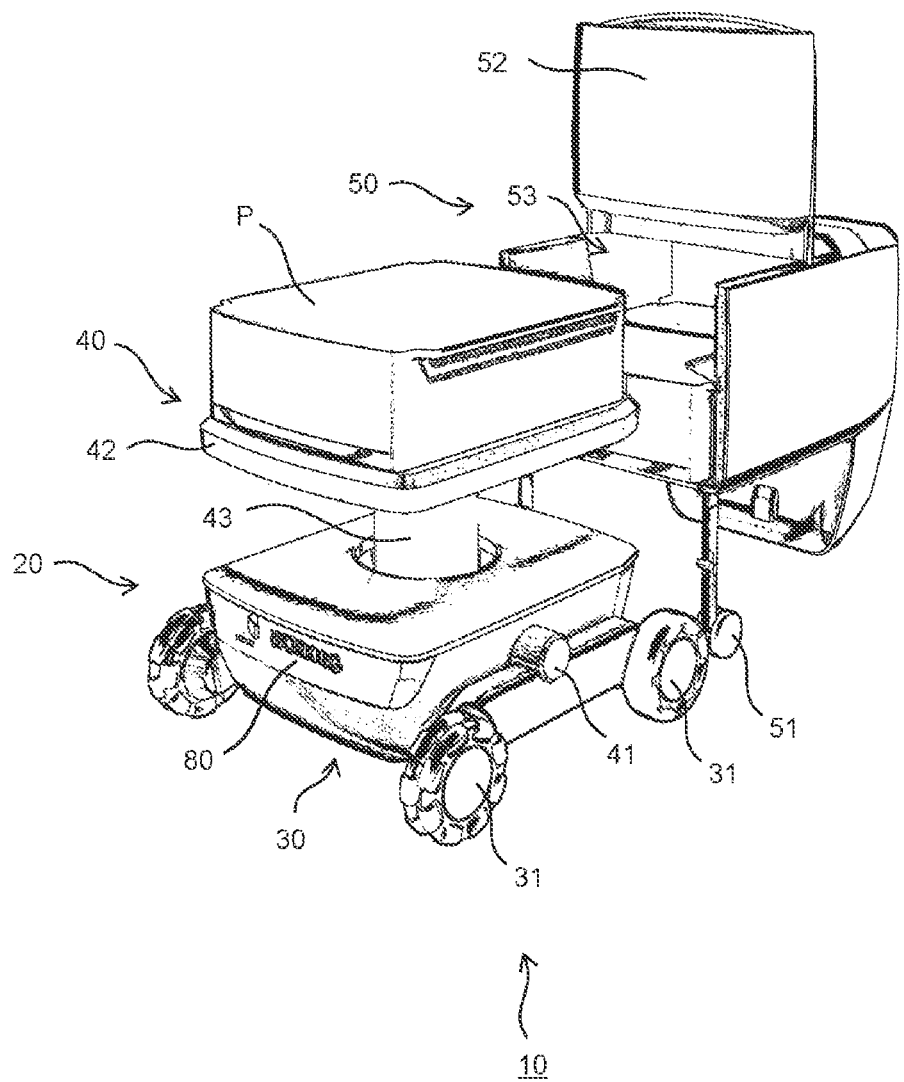
FIG. 5 is a perspective view for explaining an example of a logistics robot according to an embodiment of the present disclosure.

More specifically, as shown in FIGS. 4 and 5, the upper device 40 has a seat 42 on which the package P is to be placed. The upper device 40 or the storage unit 50 moves the package P from the storage space 53 onto the seat 42 of the upper device 40. For example, the upper device 40 or the storage unit 50 operates an actuator to move the package P from the storage space 53 onto the seat 42. Examples of the actuator include an arm, a conveyor and a roller.

The upper device 40 may further has a lifting device 43 that moves the seat 42 up and down. At a time when the package P is moved from the storage space 53 onto the seat 42, the lifting device 43 may appropriately adjust a height of the seat 42. It is thus possible to smoothly move the package P from the storage space 53 onto the seat 42.

With the package P placed on the seat 42, handing over of the package P is performed. At this time, since the robot unit 20 is provided with both the travel device 30 and the upper device 40, it is possible to freely adjust a position of the package P so that the handing over of the package P is facilitated.

Figure 6:
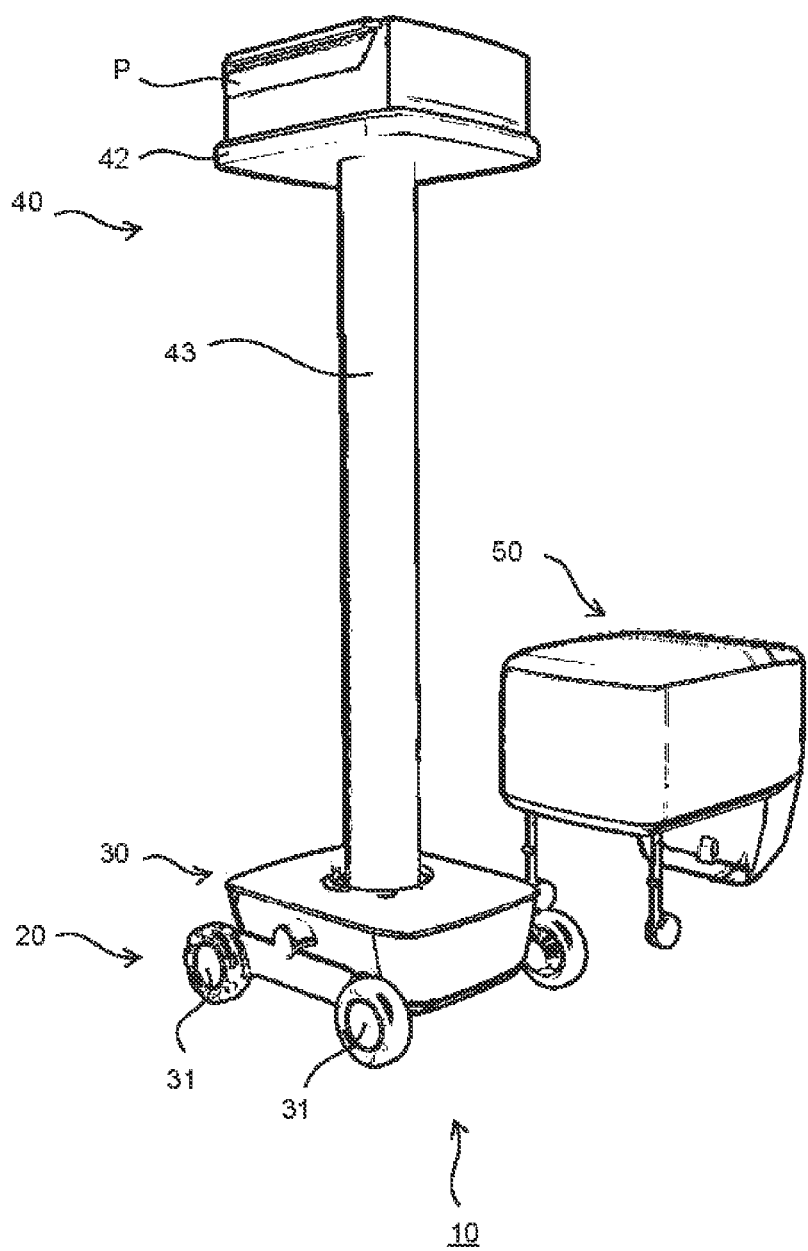
FIG. 6 is a perspective view for explaining an example of a logistics robot according to an embodiment of the present disclosure.

As an example, a case where a user directly receives the package P is considered. By using the travel device 30, the robot unit 20 is able to move the package P forward, backward, left, and right and rotate the package P so that the user can easily receive the package P. Moreover, by using the lifting device 43, the robot unit 20 is able to adjust the height of the package P so that the user can easily receive the package P. As shown in FIG. 6, the lifting device 43 may also be able to lift the package P to a high position.

As another example, a case where the package P is put in a delivery locker is considered. Also in this case, using the travel device 30 makes it possible for the robot unit 20 to move the package P forward, backward, left, and right and rotate the package P so that the package P comes closer to a specified delivery locker. Moreover, by using the lifting device 43, the robot unit 20 is able to adjust the height of the package P so that the package P comes closer to the specified delivery locker.

The robot unit 20 may communicate with a specified delivery locker 3 to automatically open and close a door of the specified delivery locker 3.

Figure 7:
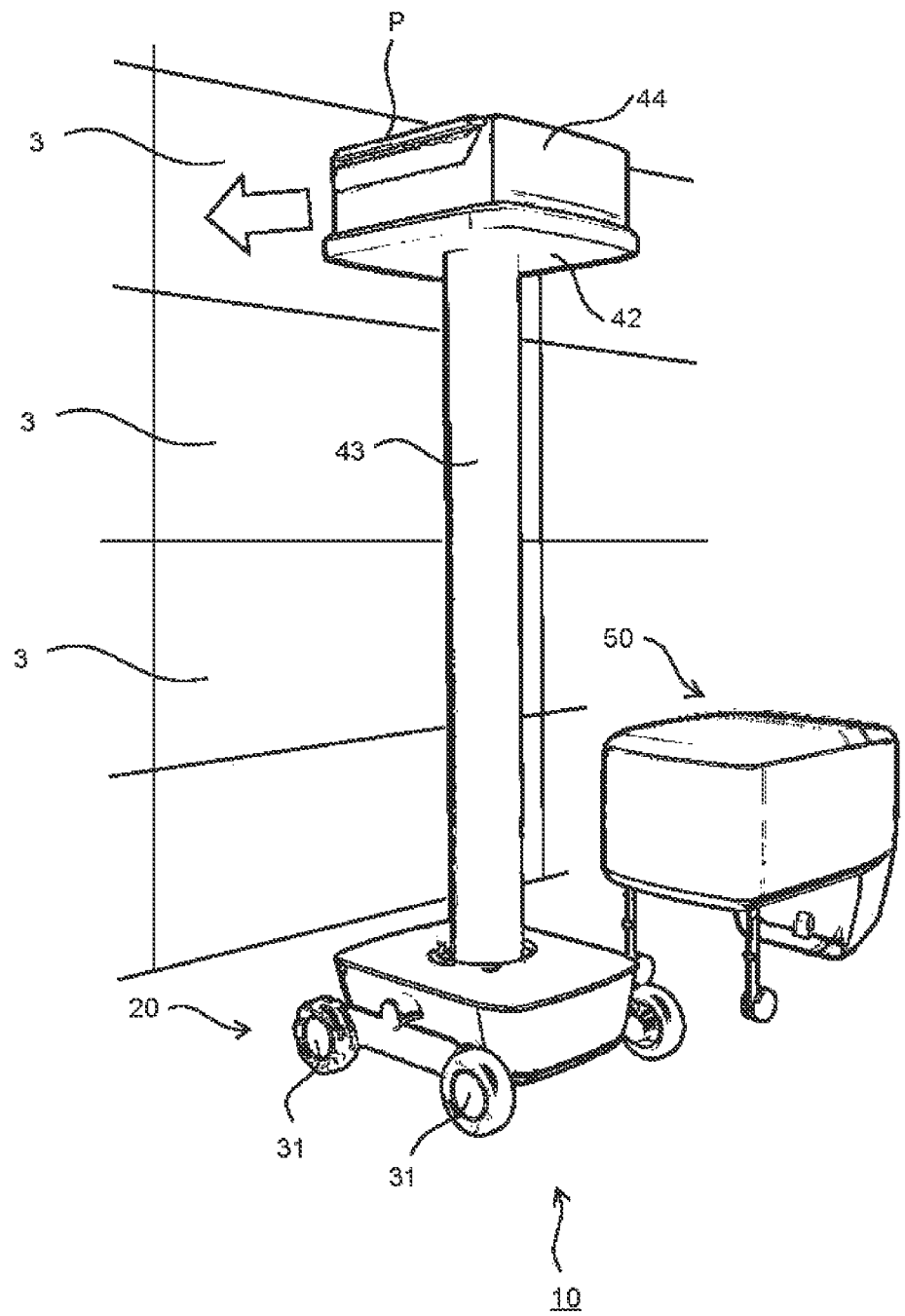
FIG. 7 is a perspective view for explaining an example of a logistics robot according to an embodiment of the present disclosure.

FIG. 7 illustrates a case where a plurality of delivery lockers 3 are aggregately installed. The robot unit 20 uses the travel device 30 and the lifting device 43 to adjust the position of the package P so that the package P can be stored in a specified delivery locker 3. Then, the robot unit 20 operates an actuator 44 provided on the seat 42 or around the seat 42 to move the package P into the specified delivery locker 3. Examples of the actuator 44 include a conveyor and a roller.

In a state where the lifting device 43 lifts the package P, the robot unit 20 may prohibit traveling by the travel device 30. After the delivery of the package P is completed and the lifting device 43 moves the seat 42 down, the robot unit 20 permits traveling by the travel device 30. It is thus possible to prevent the package P from falling off and the like.

After the delivery of the package P is completed, the robot unit 20 moves again toward under the storage unit 50. Then, the robot unit 20 and the storage unit 50 are connected and fixed with each other through the lock mechanism. After that, the logistics robot 10 starts moving toward a next destination. At this time, a message "Thank you" may be displayed on the display device 80. When the delivery of all packages P is completed, a message "Vacant" may be displayed on the display 80.

2-2. Functional Block

Figure 8:
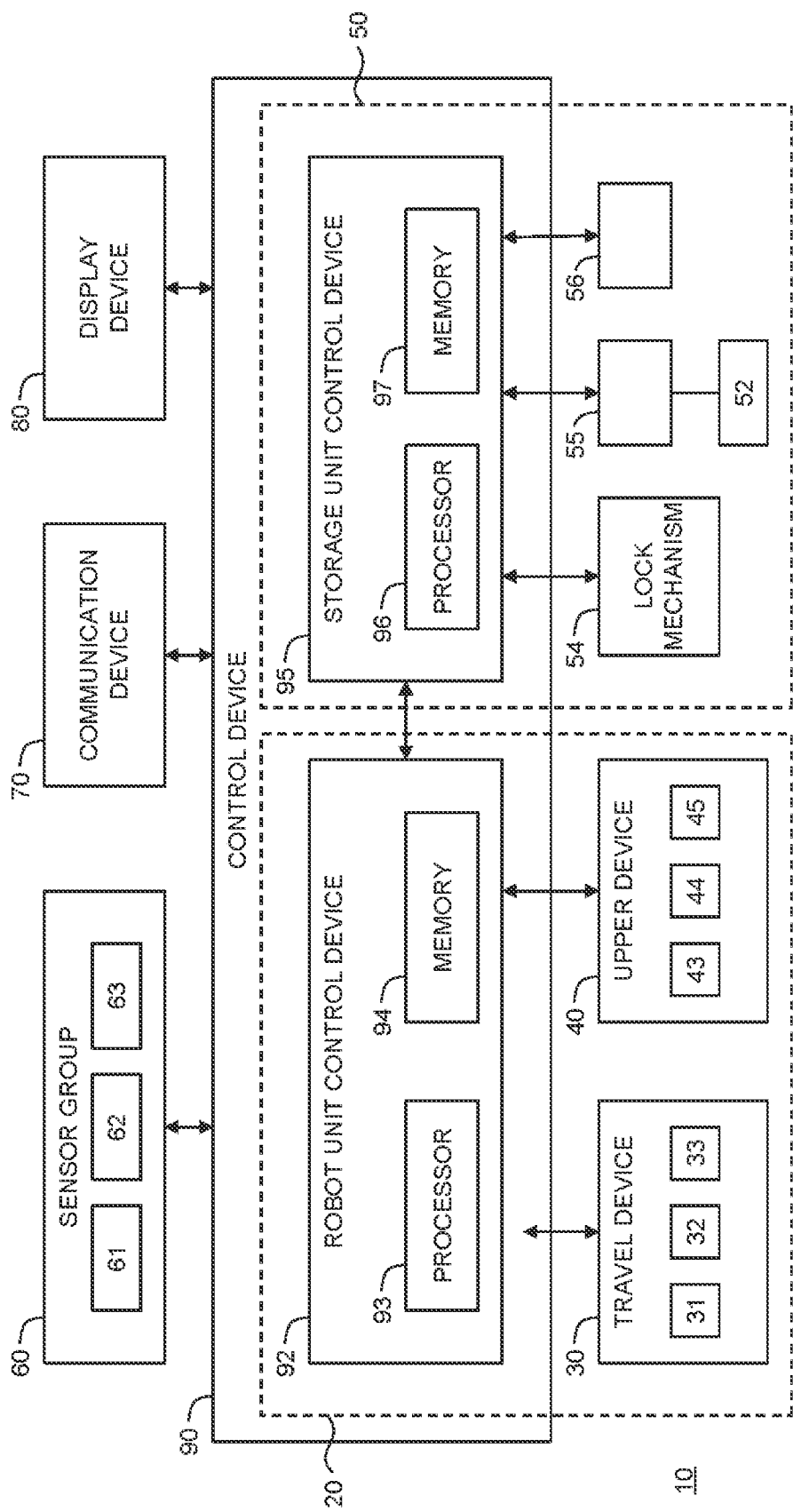
FIG. 8 is a block diagram showing a configuration example of a logistics robot according to an embodiment of the present disclosure.

FIG. 8 is a block diagram showing a configuration example of the logistics robot 10 according to the present embodiment. The logistics robot 10 includes the robot unit 20, the travel device 30, the upper device 40, the storage unit 50, a sensor group 60, a communication device 70, the display device 80, and a control device (controller) 90.

The robot unit 20 includes the travel device 30, the upper device 40, and at least a part of the control device 90 (i.e., a robot unit control device 92 described later).

The travel device 30 accelerates, decelerates, and turns the logistics robot 10. The travel device 30 includes wheels 31, motors 32 for driving the wheels 31, and a battery 33 for supplying power to the motors 32. Acceleration and deceleration of the logistics robot 10 are performed by controlling the motors 32. Braking may be performed by the use of regenerative braking by control of the motors 32. At least one of the wheels 31 may be provided with a mechanical brake. Turning of the logistics robot 10 can be realized by controlling a difference in rotation speed between the left and right wheels 31 (motors 32). As another example, a steering mechanism for steering the wheels 31 may be provided. A certain wheel 31 may be an omni wheel.

The upper device 40 includes the seat 42, and the lifting device 43 that moves the seat 42 up and down. The upper device 40 may further include an actuator 44 that moves the package P placed on the seat 42. The actuator 44 is provided on the seat 42 or around the seat 42. Examples of the actuator 44 include a conveyor and a roller. The upper device 40 may further include an actuator 45 (e.g., motor) for rotating on the lateral axis 41 (i.e., pitching motion).

The storage unit 50 includes the lid 52, the storage space 53, and a lock mechanism 54. The lid 52 covers the storage space 53. One or more packages P are stored in the storage space 53. The lock mechanism 54 connects and fixes the robot unit 20 and the storage unit 50 with each other. By unlocking the lock mechanism 54, the robot unit 20 and the storage unit 50 can be separated from each other. The storage unit 50 may further include an actuator 55 (e.g., motor) that automatically opens and closes the lid 52. The storage unit 50 may further include an actuator 56 for moving the package P onto the seat 42 of the upper device 40. Examples of the actuator 56 include a conveyor and a roller.

The sensor group 60 includes a position sensor 61, a status sensor 62, and a recognition sensor 63. Position sensor 61 acquires a position and an orientation of the logistics robot 10. Examples of the position sensor 61 include a GNSS (Global Navigation Satellite System) receiver. The status sensor 62 detects a wheel speed, a speed, an acceleration (a longitudinal acceleration, a lateral acceleration, and the like), an angular velocity (a yaw rate, and the like), a loading weight, a remaining battery level, and the like of the logistics robot 10. The recognition sensor 63 recognizes a situation around the logistics robot 10. Examples of the recognition sensor 63 include a camera, a LIDAR (LIght Detection And Ranging), a radar, a sonar, and the like.

The communication device 70 communicates with the outside of the logistics robot 10. For example, the communication device 70 communicates with the management device 100 through a wireless communication network such as 4G, 5G, and the like. The communication device 70 may be connected to a wireless LAN. The communication device 70 may perform a near field communication with another logistics robot 10 nearby. Examples of the near field communication system include infrared communication, Bluetooth (registered trademark), and the like. Moreover, the communication device 70 may acquire information on the delivery locker 3 from a transmitter attached to the delivery locker 3. The robot unit 20 may communicate with a delivery locker 3 through the communication device 70 to automatically open and close the delivery locker 3.

The display device 80 displays a variety of information. Examples of the display device 80 include a liquid crystal display, an organic EL display, and the like. For example, the display device 80 is disposed on a front surface of the robot unit 20.

The control device (controller) 90 is a computer that controls the logistics robot 10. The control device 90 includes one or more processors and one or more memories. The processor executes a variety of information processing. For example, the processor includes a CPU (Central Processing Unit). The memory stores a variety of information that is necessary for the processing by the processor. Examples of the memory include a volatile memory, a non-volatile memory, an HDD (Hard Disk Drive), an SSD (Solid State Drive), and the like. The processor executes a computer program. The function of the control device 90 is implemented by a cooperation of the processor executing the computer program and the memory.

For example, the control device 90 includes a robot unit control device 92 for controlling the robot unit 20 and a storage unit control device 95 for controlling the storage unit 50. The robot unit control device 92 includes a processor 93 and a memory 94. The storage unit control device 95 includes a processor 96 and a memory 97. The robot unit control device 92 and the storage unit control device 95 are communicably connected with each other and perform processing in cooperation with each other.

The robot unit control device 92 (the processor 93) receives a variety of information acquired by the sensor group 60, and stores the received information in the memory 94. Moreover, the robot unit control device 92 communicates with the outside through the communication device 70.

The robot unit control device 92 performs travel control (acceleration control, deceleration control, and turning control) by controlling the travel device 30. The speed, the acceleration, and the angular velocity of the logistics robot 10 are detected by the status sensor 62. The robot unit control device 92 may perform the travel control so as to avoid a collision with an object around the logistics robot 10. The object around the logistics robot 10 is recognized by the recognition sensor 63 described above.

In particular, the robot unit control device 92 performs the above-described travel control such that the robot unit 20 (the logistics robot 10) travels autonomously. More specifically, the robot unit control device 92 acquires travel route information. The travel route information indicates a travel route (a target route) to the destination. For example, the travel route is embedded in map information of the service area. The travel route is determined, for example, by the management device 100. The robot unit control device 92 communicates with the management device 100 through the communication device 70 to acquire the travel route information. The travel route information is stored in the memory 94. A current position of the logistics robot 10 is acquired by the position sensor 61 described above. The robot unit control device 92 performs the travel control such that the robot unit 20 (the logistics robot 10) travels autonomously along the travel route.

Furthermore, the robot unit control device 92 (the processor 93) controls the upper device 40. For example, the robot unit control device 92 controls the lifting device 43 to move the seat 42 up and down. The robot unit control device 92 may control the actuator 44 to move the package P placed on the seat 42. The robot unit control device 92 may control the actuator 45 to perform the pitching motion of the upper device 40.

The storage unit control device 95 operates in cooperation with the robot unit control device 92. For example, the storage unit control device 95 controls the lock mechanism 54 to connect or separate the robot unit 20 and the storage unit 50. The storage unit control device 95 may also control the actuator 55 to automatically open and close the lid 52. The storage unit control device 95 may control the actuator 56 to push the package P toward the seat 42 of the upper device 40.

2-3. Effects

According to the present embodiment, as described above, the logistics robot 10 includes the robot unit 20 and the storage unit 50. The robot unit 20—and the storage unit 50 are separable from each other. This enables more flexible operation of the logistics robot 10. For example, it is possible to constitute a basic logistics robot 10 by combining a single robot unit 20 and a single storage unit 50 (see FIGS. 2 to 7). As another example, it is possible to constitute a large logistics robot by combining a plurality of robot units 20 and a large storage unit 50 (see 10-3 in FIG. 1). As yet another example, it is also possible to constitute a large logistics robot 10 by combining a plurality of robot units 20 and a plurality of storage units 50.

Moreover, since the robot unit 20 and the storage unit 50 are separable from each other, it is possible to implement various motion functions of the robot unit 20. For example, the robot unit 20 may include the upper device 40 in addition to the travel device 30 performing acceleration, deceleration, and turning. The upper device 40 performs a behavior different from the acceleration, deceleration, and turning by the travel device 30. This enables a variety of movement of the robot unit 20.

For example, it is possible to make the upper device 40 perform the pitching motion independently of the travel device 30. In this case, it appears as if the upper device 40 gives a bow. Concurrently with the pitching motion of the upper device 40, a message (e.g., "Hello", "Thank you", and the like) to the human may be displayed on the display device 80. This enables a communication between the logistics robot 10 and the human.

Furthermore, the upper device 40 can be used for moving the package P (see FIGS. 4 to 7). More specifically, the upper device 40 has the seat 42 on which the package P is to be placed. With the package P placed on the seat 42, handing over of the package P is performed. Since the robot unit 20 is provided with both the travel device 30 and the upper device 40, it is possible to freely adjust the position of the package P so that the handing over of the package P is facilitated.

3. Configuration Example of Management Device

Figure 9:
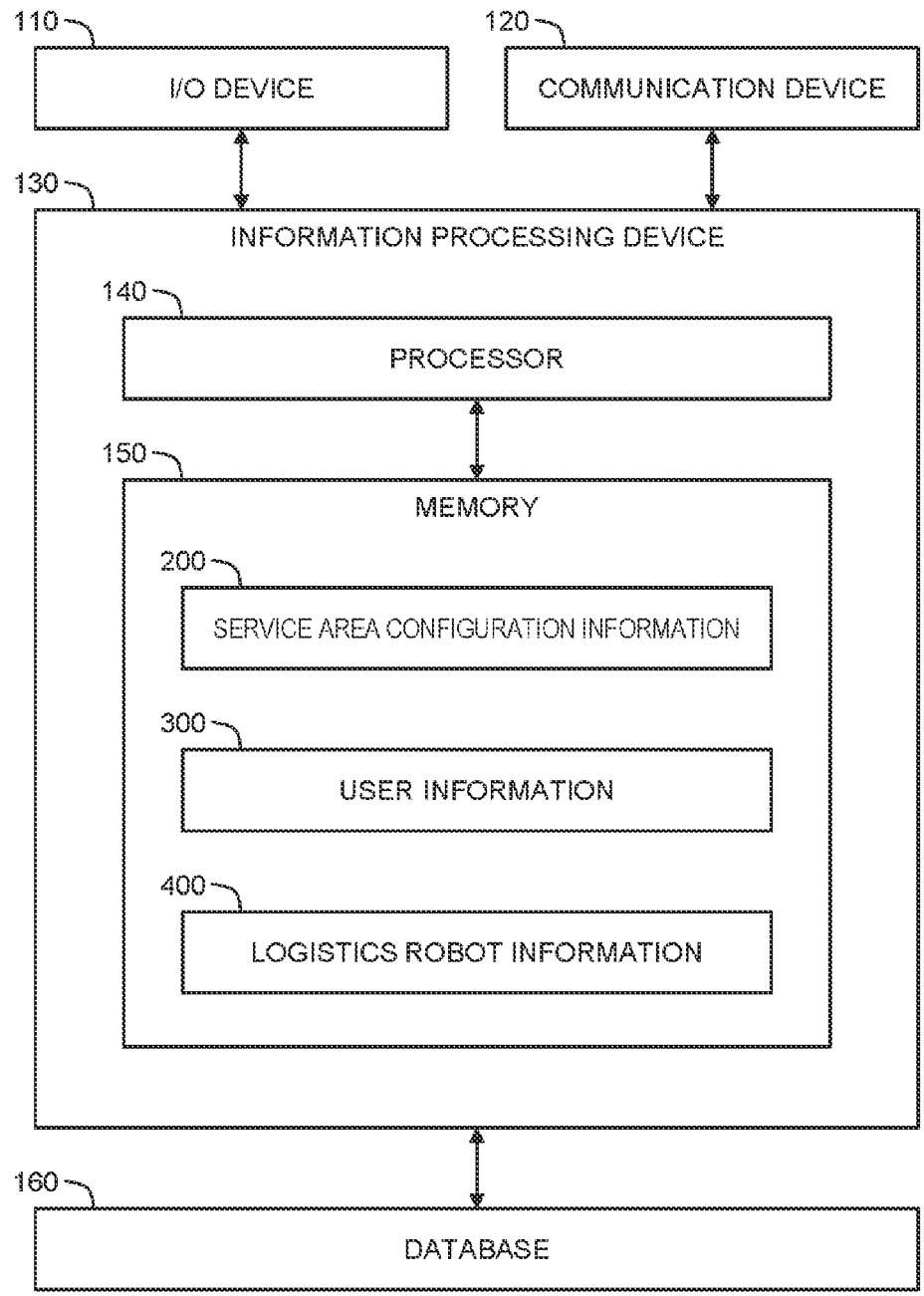
FIG. 9 is a block diagram showing a configuration example of a management device according to an embodiment of the present disclosure.

FIG. 9 is a block diagram showing a configuration example of the management device 100 (management server) according to the present embodiment. The management device 100 manages the logistics robot 10 and the logistics service. The management device 100 may be distributed servers. The management device 100 includes an input/output device 110, a communication device 120, and an information processing device 130.

The input/output device 110 is an interface for receiving information from an operator of the management device 100 and providing the operator with information. Examples of the input device include a keyboard, a mouse, a touch panel, a switch, a microphone, and the like. Examples of the output device include a display device, a speaker, and the like. The operator is able to monitor a status of the logistics service.

The communication device 120 performs a communication with the outside. For example, the communication device 120 communicates with each logistics robot 10 through a wireless communication network such as 4G, 5G, and the like. The communication device 120 may be connected to a wireless LAN. Moreover, the communication device 120 may communicate with a user terminal (e.g., PC, tablet, smartphone).

The information processing device 130 executes a variety of information processing. For example, the information processing device 130 includes a processor 140 and a memory 150. The processor 140 executes a variety of information processing. For example, the processor 140 includes a CPU. The memory 150 stores a variety of information that is necessary for the processing by the processor 140. Examples of the memory 150 include a volatile memory, a non-volatile memory, an HDD, an SSD, and the like. The function of the information processing device 130 is implemented by the processor 140 executing a computer program. The computer program is stored in the memory 150. The computer program may be recorded on a computer readable recording medium. The computer program may be provided via a network.

Moreover, the information processing device 130 can access a database 160. The database 160 is implemented by a predetermined memory. The database 160 may be included in the memory 150 of the management device 100. Alternatively, the database 160 may be external to the management device 100. The database 160 stores a variety of information necessary for delivering the logistics service. The information processing device 130 reads necessary information from the database 160 and stores the information in the memory 150.

The information necessary for delivering (providing) the logistics service includes service area configuration information 200, user information 300, and logistics robot information 400.

The service area configuration information 200 indicates a configuration of a service area (e.g., a certain city) in which the logistics service is delivered. The service area configuration includes a road layout, a building layout, a floor configuration in the building, a room layout in each floor, an elevator layout, and the like. The service area configuration information 200 is beforehand generated and registered in the database 160. The service area configuration information 200 may be updated at regular intervals.

The user information 300 is information on users of the logistics service. For example, the user information 300 includes registration information such as an ID, a name, and a residence location of each user. The user operates a user terminal to input the registration information. The user terminal transmits the registration information to the management device 100. The information processing device 130 receives the registration information through the communication device 120 and records the registration information in the database 160.

The logistics robot information 400 is information about each logistics robot 10. For example, the logistics robot information 400 includes performance information, position status information, operation information, and the like of each logistics robot 10.

The performance information includes a size, a package storage capacity, a maximum loading weight, a battery capacity, a maximum travel range, a maximum travel speed, and the like of the logistics robot 10. The performance information is generated in advance for each logistics robot 10.

The position status information indicates a current position and a status of the logistics robot 10. The current position is acquired by the position sensor 61 and the like installed on the logistics robot 10. Examples of the status of the logistics robot 10 include the speed, the acceleration, the loading weight, the remaining battery level, and the like. Such the status is detected by the status sensor 62 installed on the logistics robot 10. The information processing device 130 communicates with each logistics robot 10 through the communication device 120 to collect the position status information from each logistics robot 10.

The operation information indicates an operation status of the logistics robot 10. Examples of the operation status include "in delivery", "standby", "stuck", "failed", an the like. The information processing device 130 communicates with each logistics robot 10 through the communication device 120 to collect the operation information from each logistics robot 10.

In the case of "in delivery", the operation information may include the point of departure, the destination, and the travel route. The travel route is determined by the management device 100 (the information processing device 130).

For example, a user requests delivery of a purchased item. The delivery requests includes a requested delivery position, a requested delivery date, a requested delivery time, and the like. The information processing device 130 receives the delivery request through the communication device 120. In response to the delivery request, the information processing device 130 assigns a logistics robot 10 to perform delivery. More specifically, based on the logistics robot information 400 described above, the information processing device 130 selects a logistics robot 10 that is able to reach the requested delivery position at the requested delivery time of the requested delivery date. Further, based on the service area configuration information 200, the information processing device 130 determines an appropriate travel route from the point of departure (e.g., the logistics center) to the destination (=requested delivery position).

The information processing device 130 communicates with the selected logistics robot 10 to notify the travel route information indicating the determined travel route. The selected logistics robot 10 autonomously travels from the point of departure to the destination along the notified travel route.

What is claimed is:

1. A logistics robot for transporting a package, comprising:
   a robot unit configured to make the logistics robot travel;
   a sensor that detects presence of a human in proximity to the logistics robot; and
   a storage unit configured to store the package, wherein
   the robot unit and the storage unit are separable from each other;
   wherein the robot unit includes:
      a travel device configured to accelerate, decelerate, and turn the logistics robot; and
      an upper device provided above the travel device and configured to perform a behavior different from accelerating, decelerating, and turning by the travel device, and wherein the upper device performed a pitching motion when the sensor detects presence of a human.

2. The logistics robot according to claim 1, wherein
   the upper device has a seat on which the package is to be placed, and
   the upper device or the storage unit is further configured to move the package from the storage unit onto the seat of the upper device.

3. The logistics robot according to claim 2, wherein
   the upper device further has a lifting device that moves the seat up and down.

4. A logistics system that delivers a logistics service, comprising:
   a logistics robot configured to transport a package; and
   a management device configured to manage the logistics robot and to determine a travel route of the logistics robot, wherein
   the logistics robot comprises:
      a robot unit configured to make the logistics robot travel along the travel route;
      a sensor that detects presence of a human in proximity to the logistics robot; and
      a storage unit configured to store the package, and
      the robot unit and the storage unit are separable from each other;
      wherein the robot unit includes:
         a travel device configured to accelerate, decelerate, and turn the logistics robot; and
         an upper device provided above the travel device and configured to perform a behavior different from accelerating, decelerating, and turning by the travel device, and wherein the upper device performed a pitching motion when the sensor detects presence of a human.

* * * * *